(12) United States Patent
McHenry et al.

(10) Patent No.: US 9,888,205 B2
(45) Date of Patent: *Feb. 6, 2018

(54) SYSTEMS AND METHODS FOR INTELLIGENTLY RECORDING A LIVE MEDIA STREAM (71) Applicant: WatchGuard, Inc., Allen, TX (US)

(72) Inventors: Mark Todd McHenry, Plano, TX (US); James Walter Exner, Plano, TX (US); Michael John Von Ahnen, Dallas, TX (US); William Brian Wall, Frisco, TX (US); Brent G. Robertson, Richardson, TX (US)

(73) Assignee: WatchGuard, Inc., Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,396

(22) Filed: Feb. 6, 2017

(65) Prior Publication Data
US 2017/0150090 A1 May 25, 2017

Related U.S. Application Data (63) Continuation of application No. 14/602,855, filed on Jan. 22, 2015, now Pat. No. 9,602,761.

(51) Int. Cl.
H04N 5/77 (2006.01)
H04N 5/765 (2006.01)
(Continued)

(52) U.S. Cl.
CPC ............... *H04N 5/77* (2013.01); *G11B 27/36* (2013.01); *G11B 31/006* (2013.01);
(Continued)

(58) Field of Classification Search
None
See application file for complete search history.

(56) References Cited

U.S. PATENT DOCUMENTS 3,752,047 A 8/1973 Gordon et al.
4,258,421 A 3/1981 Juhasz et al.
(Continued)

FOREIGN PATENT DOCUMENTS

EP 707297 A1 4/1996
FR 2698596 B1 2/1995
(Continued)

OTHER PUBLICATIONS

Motorola Solutions; "Motorola Solutions Unveils Police Car of the Future in Australia"; http://newsroom.motorolasolutions.com; Feb. 15, 2014; five pages.
(Continued)

Primary Examiner — Eileen Adams
(74) Attorney, Agent, or Firm — Winstead PC (57) ABSTRACT In an embodiment, a method includes initiating a mobile device operable to continuously capture a live media stream such that recording of the live media stream is deactivated. The method further includes refraining from recording the live media stream while recording of the live media stream is deactivated. In addition, the method includes monitoring environmental conditions for one or more preconfigured indicators that the mobile device has exited the defined physical area. Also, the method includes, responsive to detection of at least one of the one or more preconfigured indicators, determining to activate recording of the live media stream.

19 Claims, 6 Drawing Sheets (51) Int. Cl.
*H04N 5/232* (2006.01)
*H04N 1/21* (2006.01)
*H04N 7/18* (2006.01)
*G11B 27/36* (2006.01)
*G11B 31/00* (2006.01)
*G06K 7/10* (2006.01)

(52) U.S. Cl.
CPC ....... *H04N 1/2112* (2013.01); *H04N 5/23203* (2013.01); *H04N 5/765* (2013.01); *H04N 7/185* (2013.01); *G06K 7/10366* (2013.01)

(56) References Cited

U.S. PATENT DOCUMENTS

| | | |
|---|---|---|
| 4,420,238 A | 12/1983 | Felix |
| 4,688,244 A | 8/1987 | Hannon et al. |
| 4,754,255 A | 6/1988 | Sanders et al. |
| 4,786,900 A | 11/1988 | Karasawa et al. |
| 4,789,904 A | 12/1988 | Peterson |
| 4,831,438 A | 5/1989 | Bellman, Jr. et al. |
| 4,843,463 A | 6/1989 | Michetti |
| 4,949,186 A | 8/1990 | Peterson |
| 4,992,943 A | 2/1991 | McCracken |
| 4,993,068 A | 2/1991 | Piosenka et al. |
| 5,027,104 A | 6/1991 | Reid |
| 5,111,289 A | 5/1992 | Lucas et al. |
| 5,136,655 A | 8/1992 | Bronson |
| 5,164,827 A | 11/1992 | Paff |
| 5,185,667 A | 2/1993 | Zimmermann |
| 5,430,431 A | 7/1995 | Nelson |
| 5,485,611 A | 1/1996 | Astle |
| 5,491,464 A | 2/1996 | Carter et al. |
| 5,491,511 A | 2/1996 | Odle |
| 5,570,127 A | 10/1996 | Schmidt |
| 5,579,239 A | 11/1996 | Freeman et al. |
| 5,677,979 A | 10/1997 | Squicciarini et al. |
| 5,682,133 A | 10/1997 | Johnson et al. |
| 5,689,442 A | 11/1997 | Swanson et al. |
| 5,708,780 A | 1/1998 | Levergood et al. |
| 5,734,337 A | 3/1998 | Kupersmit |
| 5,742,336 A | 4/1998 | Lee |
| 5,787,367 A | 7/1998 | Berra |
| 5,799,083 A | 8/1998 | Brothers et al. |
| 5,815,093 A | 9/1998 | Kikinis |
| 5,852,664 A | 12/1998 | Iverson et al. |
| 5,857,159 A | 1/1999 | Dickrell et al. |
| 5,890,079 A | 3/1999 | Levine |
| 5,917,405 A | 6/1999 | Joao |
| 5,920,338 A | 7/1999 | Katz |
| 5,926,210 A | 7/1999 | Hackett et al. |
| 6,008,841 A | 12/1999 | Charlson |
| 6,028,528 A | 2/2000 | Lorenzetti et al. |
| 6,037,977 A | 3/2000 | Peterson |
| 6,076,026 A | 6/2000 | Jambhekar et al. |
| 6,092,008 A | 7/2000 | Bateman |
| 6,141,611 A | 10/2000 | Mackey et al. |
| 6,151,065 A | 11/2000 | Steed et al. |
| 6,211,907 B1 | 4/2001 | Scaman et al. |
| 6,259,475 B1 | 7/2001 | Ramachandran et al. |
| 6,330,025 B1 | 12/2001 | Arazi et al. |
| 6,332,193 B1 | 12/2001 | Glass et al. |
| 6,421,080 B1 | 7/2002 | Lambert |
| 6,430,488 B1 | 8/2002 | Goldman et al. |
| 6,490,513 B1 | 12/2002 | Fish et al. |
| 6,518,881 B2 | 2/2003 | Monroe |
| 6,542,076 B1 | 4/2003 | Joao |
| 6,545,601 B1 | 4/2003 | Monroe |
| 6,546,363 B1 | 4/2003 | Hagenbuch |
| 6,556,905 B1 | 4/2003 | Mittelsteadt et al. |
| 6,559,769 B2 | 5/2003 | Anthony et al. |
| 6,631,522 B1 | 10/2003 | Erdelyi |
| 6,636,256 B1 | 10/2003 | Passman et al. |
| 6,684,137 B2 | 1/2004 | Takagi et al. |
| 6,831,556 B1 | 12/2004 | Boykin |
| 6,950,013 B2 | 9/2005 | Scaman et al. |
| 6,950,122 B1 | 9/2005 | Mirabile |
| 6,959,122 B2 | 10/2005 | McIntyre |
| 6,965,400 B1 | 11/2005 | Haba et al. |
| 7,131,136 B2 | 10/2006 | Monroe |
| 7,180,407 B1 | 2/2007 | Guo et al. |
| 7,190,882 B2 | 3/2007 | Gammenthaler |
| 7,363,742 B2 | 4/2008 | Nerheim |
| 7,382,244 B1 | 6/2008 | Donovan et al. |
| 7,570,158 B2 | 8/2009 | Denny et al. |
| 7,570,476 B2 | 8/2009 | Nerheim |
| 7,768,548 B2 | 8/2010 | Silvernail et al. |
| 7,804,426 B2 | 9/2010 | Etcheson |
| 7,944,676 B2 | 5/2011 | Smith et al. |
| 8,050,206 B2 | 11/2011 | Siann et al. |
| 8,446,469 B2 | 5/2013 | Blanco et al. |
| 8,487,995 B2 | 7/2013 | Vanman et al. |
| 8,594,485 B2 | 11/2013 | Brundula |
| 8,781,292 B1 | 7/2014 | Ross et al. |
| 8,805,431 B2 | 8/2014 | Vasavada et al. |
| 8,837,901 B2 | 9/2014 | Shekarri et al. |
| 9,019,431 B2 | 4/2015 | Phillips et al. |
| 9,058,499 B1 | 6/2015 | Smith |
| 9,159,371 B2 | 10/2015 | Ross et al. |
| 9,253,452 B2 | 2/2016 | Ross et al. |
| 9,325,950 B2 | 4/2016 | Haler |
| 9,331,997 B2 | 5/2016 | Smith |
| 9,377,161 B2 | 6/2016 | Hanchett et al. |
| 9,602,761 B1* | 3/2017 | McHenry ................. H04N 5/77 |
| 2002/0135679 A1 | 9/2002 | Scaman |
| 2002/0183905 A1 | 12/2002 | Maeda et al. |
| 2003/0052798 A1 | 3/2003 | Hanson |
| 2003/0052970 A1 | 3/2003 | Dodds et al. |
| 2003/0086000 A1 | 5/2003 | Siemens et al. |
| 2003/0151663 A1 | 8/2003 | Lorenzetti et al. |
| 2003/0154009 A1 | 8/2003 | Basir et al. |
| 2003/0210329 A1 | 11/2003 | Aagaard et al. |
| 2003/0210806 A1 | 11/2003 | YoichiShintani et al. |
| 2003/0212567 A1 | 11/2003 | Shintani et al. |
| 2004/0008255 A1 | 1/2004 | Lewellen |
| 2004/0201765 A1 | 10/2004 | Gammenthaler |
| 2004/0252193 A1 | 12/2004 | Higgins |
| 2005/0083404 A1 | 4/2005 | Pierce et al. |
| 2005/0099273 A1 | 5/2005 | Shimomura et al. |
| 2005/0101334 A1 | 5/2005 | Brown et al. |
| 2005/0128064 A1* | 6/2005 | Riesebosch ............ B60Q 9/001 340/457 |
| 2005/0151852 A1 | 7/2005 | Jomppanen |
| 2005/0243171 A1 | 11/2005 | Ross et al. |
| 2005/0258942 A1 | 11/2005 | Manasseh et al. |
| 2006/0012683 A9 | 1/2006 | Lao et al. |
| 2006/0133476 A1 | 6/2006 | Page et al. |
| 2006/0209189 A1 | 9/2006 | Simpson |
| 2006/0274166 A1 | 12/2006 | Lee et al. |
| 2007/0013776 A1 | 1/2007 | Venetianer et al. |
| 2007/0035612 A1 | 2/2007 | Korneluk et al. |
| 2007/0188612 A1 | 8/2007 | Carter |
| 2007/0219686 A1 | 9/2007 | Plante |
| 2007/0260363 A1 | 11/2007 | Miller |
| 2007/0274705 A1 | 11/2007 | Kashiwa et al. |
| 2008/0036580 A1* | 2/2008 | Breed ............... B60R 21/01536 340/438 |
| 2008/0100705 A1 | 5/2008 | Kister et al. |
| 2009/0002491 A1 | 1/2009 | Haler |
| 2009/0088267 A1 | 4/2009 | Shimazaki et al. |
| 2009/0195655 A1 | 8/2009 | Pandey |
| 2009/0207252 A1 | 8/2009 | Raghunath |
| 2010/0026802 A1 | 2/2010 | Titus et al. |
| 2010/0165109 A1* | 7/2010 | Lang ...................... G06T 7/20 348/158 |
| 2010/0309971 A1 | 12/2010 | Vanman et al. |
| 2010/0321183 A1 | 12/2010 | Donovan et al. |
| 2011/0052137 A1 | 3/2011 | Cowie |
| 2011/0285845 A1 | 11/2011 | Bedros et al. |
| 2014/0139680 A1 | 5/2014 | Huang et al. |
| 2014/0192192 A1 | 7/2014 | Worrill et al. |
| 2014/0355951 A1 | 12/2014 | Tabak |
| 2015/0050923 A1* | 2/2015 | Tu ........................ H04W 4/046 455/418 |
| 2015/0051502 A1 | 2/2015 | Ross |

(56) References Cited

U.S. PATENT DOCUMENTS

| | | |
|---|---|---|
| 2015/0063776 A1 | 3/2015 | Ross et al. |
| 2016/0035391 A1 | 2/2016 | Ross et al. |
| 2016/0182850 A1 | 6/2016 | Thompson |

FOREIGN PATENT DOCUMENTS

| | | |
|---|---|---|
| GB | 2287152 A | 9/1995 |
| GB | 2317418 A | 3/1998 |
| JP | 2006311039 A | 11/2006 |
| KR | 10-1050897 B1 | 7/2011 |
| WO | WO-1993020655 A1 | 10/1993 |
| WO | WO-1994019212 A2 | 9/1994 |
| WO | WO-1995028783 A1 | 10/1995 |
| WO | WO-1996022202 A1 | 7/1996 |
| WO | WO-1997038526 A1 | 10/1997 |
| WO | WO-1998052358 A1 | 11/1998 |
| WO | WO-1999018410 A1 | 4/1999 |
| WO | WO-01097524 A1 | 12/2001 |
| WO | WO-2004/036926 A2 | 4/2004 |
| WO | WO-2007104367 A1 | 9/2007 |
| WO | WO-2013100993 A1 | 7/2013 |

OTHER PUBLICATIONS

Rowe, Lawrence A., et al.; "Indexes for User Access to Large Video Databases"; Storage and Retrieval for Image and Video Databases II, IS&T/SPIE Symp. on Elec. Imaging Sci. & Tech.; San Jose, CA; Feb. 1994; 12 pages.

Polybius; "The Histories," vol. III: Books 5-8; Harvard University Press; 1923; pp. 385 & 387.

Crisman, P.A. (editor); "The Compatible Time-Sharing System: A Programmer's Guide," second edition; The M.I.T. Press, Cambridge Massachusetts; 1965; 587 pages.

Kotadia, Munir; "Gates Predicts Death of the Password"; http://www.cnet.com/news/gates-predicts-death-of-the-password/?ftag=CADe856116&bhid=; Feb. 25, 2004; 3 pages.

Morris, Robert, et al.; "Password Security: A Case History"; Communications of the ACM, vol. 22, No. 11; Nov. 1979; pp. 594-597.

Cranor, Lorrie Faith, et al.; "Security and Usability: Designing Secure Systems that People Can Use"; O'Reilly Media; Aug. 2005; pp. 3 & 104.

Chirillo, John; "Hack Attacks Encyclopedia: A Complete History of Hacks, Cracks, Phreaks, and Spies Over Time"; John Wiley & Sons, Inc.; 2001; 485-486.

Stonebraker, Michael, et al.; "Object-Relational DBMSs: Tracking the Next Great Wave"; Second Ed.; Morgan Kaufmann Publishers, Inc.; 1999; pp. 3, 173, 232-237, 260.

Stonebraker, Michael, et al.; "Object-Relational DBMSs: The Next Great Wave"; Morgan Kaufmann Publishers, Inc.; 1996; pp. 105, 107, 166-168.

Barwick, Sandra; "Two Wheels Good, Four Wheels Bad"; The Independent; http://www.independent.co.uk/voices/two-wheels-good-four-wheels-bad-1392034.html; Feb. 1994; 11 pages.

McFee, John E., et al.; "Multisensor Vehicle-Mounted Teleoperated Mine Detector with Data Fusion"; SPIE Proceedings, vol. 3392; Apr. 13, 1998; 2 pages.

Malcolm, Andrew H.; "Drunken Drivers Now Facing Themselves on Video Camera"; The New York Times; http://www.nytimes.com/1990/04/21/us/drunken-drivers-now-facing-themselves-on-video-camera.html; Apr. 21, 1990; 3 pages.

Kaplan, A.E., et al.; "An Internet Accessible Telepresence"; Multimedia Systems, vol. 5, Issue 2; Mar. 1997; Abstract only; 2 pages.

Sabatini, Richard V.; "State Police Cars in Pa. Get Cameras Patrol Stops Will be Videotaped. The Units will Benefit Citizens and Police, Authorities Say"; http://articles.philly.com/1996-03-30/news/25637501_1_patrol-car-state-police-commissioner-paul-j-evanko; Mar. 30, 1996; 2 pages.

Stockton, Gregory R., et al.; "Why Record? (Infrared Video)"; Infraspection Institute's IR/INFO '98 Symposium, Orlando, Florida; Jan. 25-28, 1998; 5 pages.

Racepak LLC; "Racepak DataLink Software" http://www.racepak.com/software.php.; Feb. 3, 2008; 4 pages.

Pavlopoulos, S., et al.; "A Novel Emergency Telemedicine System Based on Wireless Communication Technology—AMBULANCE"; IEEE Trans Inf Technol Biomed, vol. 2, No. 4; Dec. 1998; Abstract only; 2 pages.

Horne, Mike; "Future Video Accident Recorder"; http://www.iasa.com.au/folders/Publications/pdf_library/horne.pdf; May 1999; 9 pages.

Townsend & Taphouse; "Microsentinel I"; http://www.blacksheepnetworks.com/security/resources/encyclopedia/products/prod19.htm; Jul. 5, 2003; 1 page.

Security Data Networks, Inc.; "Best of Show Winner at CES Consumer Electronics Show is MicroSentinel(R) Wireless Internet Based Security System that Allows Users to Monitor their Home, Family, or Business using any Internet or E-Mail Connection"; PR Newswire; http://www.prnewswire.com/news-releases/best-of-show-winner-at-ces-consumer-electronics-show-is-microsentinelr-wireless-internet-based-security-system-that-allows-users-to-monitor-their-home-family-or-business-using-any-internet-or-e-mail-connection-73345197.html; Jan. 7, 1999; 3 pages.

Draper, Electra; "Mission Possible for Loronix"; Denver Post; http://extras.denverpost.com/business/top100b.htm; Aug. 13, 2000; 2 pages.

"Choosing the Right Password"; The Information Systems Security Monitor (ISSM); vol. 2, No. 2; Apr. 1992; 2 pages.

Aref, Walid G., et al.; "A Video Database Management System for Advancing Video Database Research"; In Proc. of the Int Workshop on Management Information Systems; Nov. 2002; 10 pages.

ICOP Extreme Wireless Mic, Operation Supplement; 2008.

Raytheon JPS Communications, Ratheon Model 20/20-W, Raytheon 20/20 Vision Digital In-Car Video Systems; Feb. 2010.

Product Review: ICOP Model 20/20-W; May 19, 2009.

State of Utah Invitation to Bid State Cooperative Contract, Contract No. MA503; Jul. 3, 2008.

Taser X26 Specification Sheet; 2003.

Affidavit of Christopher Butler of Internet Archive attesting to the public availability of the 20/20-W Publication on Nov. 25, 2010.

International Association of Chiefs of Police Digital Video System Minimum Specifications Nov. 21, 2008.

City of Pomona Request for Proposal for Mobile Video Recording System for Police Vehicles; Apr. 4, 2013.

"Taser Int'l (TASR) Challenges to Digital Ally's (DGLY) Patents", StreetInsider.com, http://www.streetinsider.com/Corporate+News/Taser+Intl+(TASER)+Challenges+to+Digital+Allys+(DGLY)+Patents/12302550 html Dec. 1, 2016.

Sony Corporation; "Network Camera: User's Guide: Software Version 1.0: SNC-RZ25N/RZ25P"; 2004; 81 pages.

\* cited by examiner

SYSTEMS AND METHODS FOR INTELLIGENTLY RECORDING A LIVE MEDIA STREAM

CROSS-REFERENCE TO RELATED APPLICATIONS

This patent application is a continuation of U.S. patent application Ser. No. 14/602,855, which was filed on Jan. 22, 2015, the entirety of which is incorporated herein by reference.

BACKGROUND

Technical Field

The present disclosure relates generally to media capture and more particularly, but not by way of limitation, to systems and methods for intelligently recording a live media stream.

History of Related Art

Capture devices such as wearable cameras and microphones may capture audio and/or video for storage and retrieval. A significant portion of the captured data is often irrelevant. For example, a video camera worn on a police officer's chest may capture lengthy video of a police car's dash or of a steering wheel. Storage operations and network transmissions involving the captured data are typically grossly inefficient due to the sheer volume of irrelevant data.

SUMMARY

In an embodiment, a method includes initiating a mobile device operable to continuously capture a live media stream such that recording of the live media stream is deactivated. The method further includes refraining from recording the live media stream while recording of the live media stream is deactivated. In addition, the method includes monitoring environmental conditions for one or more preconfigured indicators that the mobile device has exited the defined physical area. Also, the method includes, responsive to detection of at least one of the one or more preconfigured indicators, determining to activate recording of the live media stream.

In one embodiment, a system includes at least one processor, wherein the at least one processor is operable to implement a method. The method includes initiating a mobile device operable to continuously capture a live media stream such that recording of the live media stream is deactivated. The method further includes refraining from recording the live media stream while recording of the live media stream is deactivated. In addition, the method includes monitoring environmental conditions for one or more preconfigured indicators that the mobile device has exited the defined physical area. Also, the method includes, responsive to detection of at least one of the one or more preconfigured indicators, determining to activate recording of the live media stream.

In one embodiment, a computer-program product includes a non-transitory computer-usable medium having computer-readable program code embodied therein. The computer-readable program code is adapted to be executed to implement a method. The method includes initiating a mobile device operable to continuously capture a live media stream such that recording of the live media stream is deactivated. The method further includes refraining from recording the live media stream while recording of the live media stream is deactivated. In addition, the method includes monitoring environmental conditions for one or more preconfigured indicators that the mobile device has exited the defined physical area. Also, the method includes, responsive to detection of at least one of the one or more preconfigured indicators, determining to activate recording of the live media stream.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

In certain embodiments, mobile devices, such as wearable video cameras, can be integrated with an in-vehicle video system. The wearable video cameras can be triggered to begin recording at the same time the in-vehicle video system begins recording. Typical triggers can include, but are not limited to, emergency-light activation, siren activation, a detected speed in excess of a threshold, excessive g-force events (e.g., collisions), activation of a wireless microphone, combinations of same, and/or the like. However, the value of the video captured by the wearable video camera is often useless until a wearer (e.g., a police officer) exits the vehicle. For example, while the wearer is inside the vehicle, the camera may only be capturing an image of the vehicle's dash or steering wheel. Therefore, in certain embodiments, triggering the wearable video camera to record, for example, at the same time the in-vehicle video camera system begins recording, can result in unnecessary and uninteresting video. This video can result in increases to both system storage costs and the time to transfer the video out of the vehicle.

The present disclosure describes examples of intelligently recording a live media stream such as, for example, live video, live audio, combinations of same, and/or the like. A mobile device, such as a wearable microphone or video camera, can be used to capture the live media stream. In certain embodiments, the mobile device or another computer system can monitor environmental conditions for preconfigured indicators that the mobile device has exited a defined physical area (i.e., exit indicators). In an example, recording of the live media stream can be activated in response to detection of an exit indicator. In another example, recording of the live media stream can be deactivated in response to detection of a preconfigured indicator that the mobile device has entered the defined physical area (i.e., an entry indicator). Advantageously, in certain embodiments, storage resources can be preserved by ensuring that a live media stream is only recorded when the mobile device is outside the defined physical area.

Figure 1:
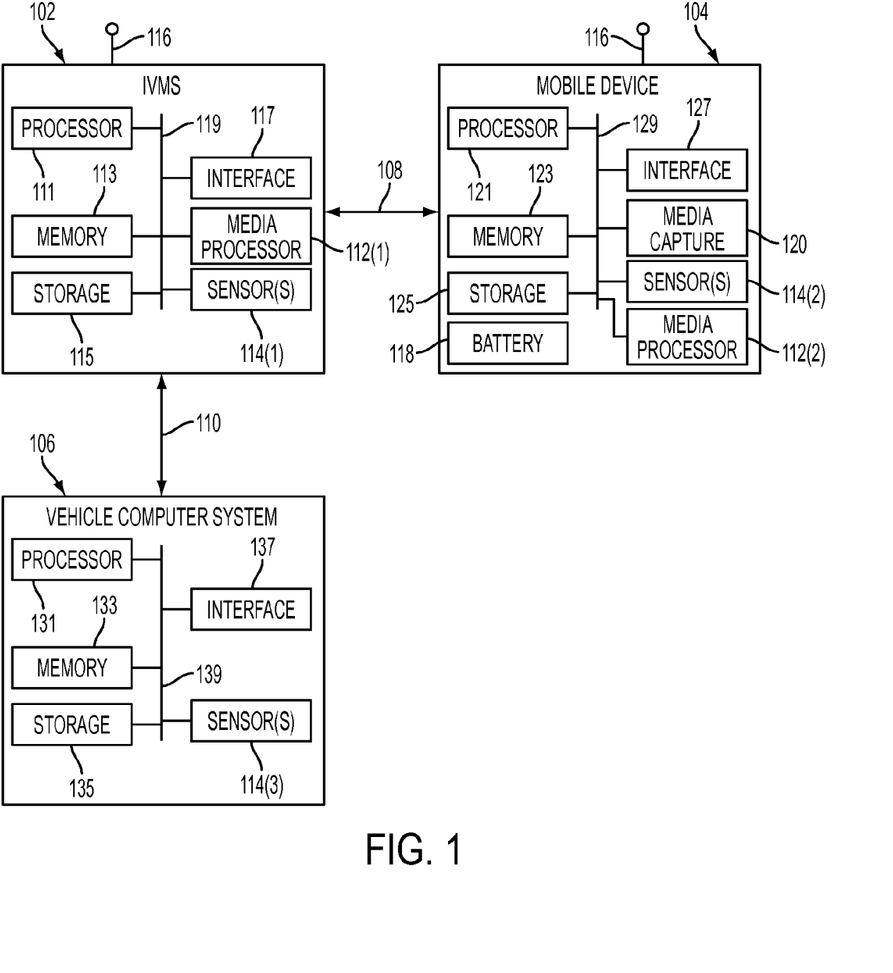
FIG. 1 illustrates an example of a system for intelligently recording a live media stream.

FIG. 1 illustrates an example of a system 100 for intelligently recording a live media stream. The system 100 can include an in-vehicle media system (IVMS) 102, a mobile device 104, and a vehicle computer system 106. In certain embodiments, the IVMS 102 can be communicably coupled to the mobile device 104 and the vehicle computer system 106 via a communication link 108 and a communication link 110, respectively. The communication link 108 and the communication link 110 can be representative of wired and/or wireless communication. For example, the communication link 110 can be representative of the IVMS 102 being coupled to an on-board diagnostic (OBD) port of the vehicle computer system 106.

The IVMS 102 is typically operable to receive, process, and store media such as audio and/or video as it is received from the mobile device 104 and/or other media sources. An example of functionality that the IVMS 102 can include is described in U.S. Pat. No. 8,487,995 ("the '995 patent"). The '995 patent is hereby incorporated by reference. In general, the mobile device 104 can capture the media and, in some cases, provide same to the IVMS 102 in a continuous, ongoing fashion. The vehicle computer system 106 is typically integrated with a particular vehicle, for example, by a manufacturer of the vehicle. The vehicle computer system 106 can perform, among other functions, self-diagnostic and reporting functionality for the vehicle.

The IVMS 102, mobile device 104, and vehicle computer system 106 may each include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of IVMS 102, mobile device 104, and vehicle computer system 106 may comprise any suitable physical form, configuration, number, type and/or layout. As an example, and not by way of limitation, IVMS 102, mobile device 104, and/or vehicle computer system 106 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, IVMS 102, mobile device 104, and/or vehicle computer system 106 may include one or more computer systems; be unitary or distributed; span multiple locations; span multiple machines; or reside in a cloud, which may include one or more cloud components in one or more networks.

In the depicted embodiment, IVMS 102, mobile device 104, and vehicle computer system 106 each include their own respective processors 111, 121, and 131; memory 113, 123, and 133; storage 115, 125, and 135; interfaces 117, 127, and 137; and buses 119, 129, and 139. Although a system is depicted having a particular number of particular components in a particular arrangement, this disclosure contemplates any system having any suitable number of any suitable components in any suitable arrangement. For simplicity, similar components of IVMS 102, mobile device 104, and vehicle computer system 106 will be discussed together while referring to the components of IVMS 102. However, it is not necessary for these devices to have the same components, or the same type of components. For example, processor 111 may be a general purpose microprocessor and processor 121 may be an application specific integrated circuit (ASIC).

Processor 111 may be a microprocessor, controller, or any other suitable computing device, resource, or combination of hardware, software and/or encoded logic operable to provide, either alone or in conjunction with other components, (e.g., memory 113) wireless networking functionality. Such functionality may include providing various features discussed herein. In particular embodiments, processor 111 may include hardware for executing instructions, such as those making up a computer program. As an example and not by way of limitation, to execute instructions, processor 111 may retrieve (or fetch) instructions from an internal register, an internal cache, memory 113, or storage 115; decode and execute them; and then write one or more results to an internal register, an internal cache, memory 113, or storage 115.

In particular embodiments, processor 111 may include one or more internal caches for data, instructions, or addresses. This disclosure contemplates processor 111 including any suitable number of any suitable internal caches, where appropriate. As an example and not by way of limitation, processor 111 may include one or more instruction caches, one or more data caches, and one or more translation lookaside buffers (TLBs). Instructions in the instruction caches may be copies of instructions in memory 113 or storage 115 and the instruction caches may speed up retrieval of those instructions by processor 111. Data in the data caches may be copies of data in memory 113 or storage 115 for instructions executing at processor 111 to operate on; the results of previous instructions executed at processor 111 for access by subsequent instructions executing at processor 111, or for writing to memory 113, or storage 115; or other suitable data. The data caches may speed up read or write operations by processor 111. The TLBs may speed up virtual-address translations for processor 111. In particular embodiments, processor 111 may include one or more internal registers for data, instructions, or addresses. Depending on the embodiment, processor 111 may include any suitable number of any suitable internal registers, where appropriate. Where appropriate, processor 111 may include one or more arithmetic logic units (ALUs); be a multi-core processor; include one or more processors 111; or any other suitable processor.

Memory 113 may be any form of volatile or non-volatile memory including, without limitation, magnetic media, optical media, random access memory (RAM), read-only memory (ROM), flash memory, removable media, or any other suitable local or remote memory component or components. In particular embodiments, memory 113 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 113 may include one or more memories 113, where appropriate. Memory 113 may store any suitable data or information utilized by IVMS 102, including software embedded in a computer readable medium, and/or encoded logic incorporated in hardware or otherwise stored (e.g., firmware). In particular embodiments, memory 113 may include main memory for storing instructions for processor 111 to execute or data for processor 111 to operate on. In particular embodiments, one or more memory management units (MMUs) may reside between processor 111 and memory 113 and facilitate accesses to memory 113 requested by processor 111.

As an example and not by way of limitation, IVMS 102 may load instructions from storage 115 or another source (such as, for example, another computer system) to memory 113. Processor 111 may then load the instructions from memory 113 to an internal register or internal cache. To execute the instructions, processor 111 may retrieve the instructions from the internal register or internal cache and decode them. During or after execution of the instructions, processor 111 may write one or more results (which may be intermediate or final results) to the internal register or internal cache. Processor 111 may then write one or more of those results to memory 113. In particular embodiments, processor 111 may execute only instructions in one or more internal registers or internal caches or in memory 113 (as opposed to storage 115 or elsewhere) and may operate only on data in one or more internal registers or internal caches or in memory 113 (as opposed to storage 115 or elsewhere).

In particular embodiments, storage 115 may include mass storage for data or instructions. As an example and not by way of limitation, storage 115 may include a hard disk drive (HDD), a floppy disk drive, flash memory, an optical disc, a magneto-optical disc, magnetic tape, or a Universal Serial Bus (USB) drive or a combination of two or more of these. Storage 115 may include removable or non-removable (or fixed) media, where appropriate. Storage 115 may be internal or external to IVMS 102, where appropriate. In particular embodiments, storage 115 may be non-volatile, solid-state memory. In particular embodiments, storage 115 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 115 may take any suitable physical form and may comprise any suitable number or type of storage. Storage 115 may include one or more storage control units facilitating communication between processor 111 and storage 115, where appropriate.

In particular embodiments, interface 117 may include hardware, encoded software, or both providing one or more interfaces for communication (such as, for example, packet-based communication) among IVMS 102, mobile device 104, vehicle computer system 106, any networks, any network devices, and/or any other computer systems. As an example and not by way of limitation, communication interface 117 may include a network interface controller (NIC) or network adapter for communicating with an Ethernet or other wire-based network and/or a wireless NIC (WNIC) or wireless adapter for communicating with a wireless network.

In some embodiments, interface 117 comprises one or more radios coupled to one or more physical antenna ports 116. Depending on the embodiment, interface 117 may be any type of interface suitable for any type of network with which the system 100 is used. As an example and not by way of limitation, the system 100 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the system 100 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. IVMS 102 may include any suitable interface 117 for any one or more of these networks, where appropriate.

In some embodiments, interface 117 may include one or more interfaces for one or more I/O devices. One or more of these I/O devices may enable communication between a person and IVMS 102. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 117 for them. Where appropriate, interface 117 may include one or more drivers enabling processor 111 to drive one or more of these I/O devices. Interface 117 may include one or more interfaces 117, where appropriate.

Bus 119 may include any combination of hardware, software embedded in a computer readable medium, and/or encoded logic incorporated in hardware or otherwise stored (e.g., firmware) to couple components of IVMS 102 to each other. As an example and not by way of limitation, bus 119 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 119 may include any number, type, and/or configuration of buses 119, where appropriate. In particular embodiments, one or more buses 119 (which may each include an address bus and a data bus) may couple processor 111 to memory 113. Bus 119 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 111 (such as, for example, one or more internal registers or caches), one or more portions of memory 113, one or more portions of storage 115, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Referring more specifically to the mobile device 104, the mobile device 104 can include a media capture component 120 and a battery 118. The media capture component 120 can include video-capture hardware and/or software (e.g., a camera), audio-capture hardware and/or software (e.g., a microphone), combinations of same, and/or the like. In a typical embodiment, the media capture component 120 enables the mobile device 104 to capture the live media stream for processing and storage. The battery 118 typically provides a limited power source to the mobile device 104.

Furthermore, the IVMS 102 and the mobile device 104 can include a media processor 112(1) and a media processor 112(2), respectively (collectively, media processor(s) 112). The media processor(s) 112 can include software and/or hardware to process a live media stream and store the live media stream in memory (e.g., in the storage 115 or the storage 125). It should be appreciated that the media processor(s) 112 are shown for illustrative purposes. In various embodiments, the media processor 112(1) and/or the media processor 112(2) can be omitted.

For example, in an embodiment, processing and storage of the live media stream can occur entirely on the IVMS 102. In these embodiments, the media processor 112(2) of the mobile device 104 can be omitted. According to this example, the media capture component 120 of the mobile device 104 can continuously capture and send the live media stream to the IVMS 102 over the communication link 108. The media processor 112(1) of the IVMS 102 can receive, process, and store the live media stream in the storage 115 in the fashion described above. An example of processing and storing the live media stream on the IVMS 102 will be described with respect to FIGS. 3A-3B.

In another example, in an embodiment, processing and storage of the live media stream can occur entirely on the mobile device 104. In these embodiments, the media processor 112(1) of the IVMS 102 can be omitted. According to this example, the media capture component 120 of the mobile device 104 can continuously capture the live media stream as described above. In addition, the media processor 112(2) can receive, process, and store the live media stream in the storage 125 in the fashion described above. In that way, in many cases, the mobile device 104 can operate independently of the IVMS 102 and the vehicle computer system 106. In these cases, the IVMS 102 and/or the vehicle computer system 106 may also be omitted. An example of processing and storing the live media stream on the mobile device 104 will be described with respect to FIG. 4.

In addition, in some embodiments, processing and storage of the media stream can occur on both the IVMS 102 and the mobile device 104. In these embodiments, the media processor 112(1) and the media processor 112(2) can perform their respective media-processing functionality in parallel such that multiple copies of at least a portion of the captured media stream is maintained. In various cases, the media processor 112(2) can maintain a short-term cache, most recently captured media, combinations of same, and/or the like.

In certain embodiments, the media processor(s) 112 can activate or deactivate recording of the live media stream based, at least in part, on whether the mobile device 104 is deemed to be inside or outside the vehicle. In general, the media processor(s) 112 refrain from recording the live media stream while recording is deactivated. More specifically, the media processor(s) 112 can monitor environmental conditions for exit indicators, i.e., one or more preconfigured indicators that the mobile device 104 has exited the vehicle. In similar fashion, the media processor(s) 112 can monitor environmental conditions for entry indicators, i.e., one or more preconfigured indicators that the mobile device 104 has entered the vehicle. For example, as shown, the IVMS 102, the mobile device 104, and the vehicle computer system 106 can include sensors 114(1), 114(2), and 114(3), respectively (collectively, sensors 114).

The sensors 114 can provide information usable by the media processor(s) 112 to determine whether the mobile device 104 is inside a defined physical area (e.g., inside the vehicle). It should be appreciated that the sensors 114 are illustrative of an example arrangement. In various embodiments, the sensors 114 can reside exclusively on the IVMS, exclusively on the mobile device 104, exclusively on the vehicle computer system 106, etc. In general, the sensors 114 can reside on any combination of the IVMS 102, the mobile device 104, and the vehicle computer system 106. In some embodiments, the media processor 112(1) of the IVMS 102 can monitor the sensors 114(3) of the vehicle computer system 106 over the communication link 110 (e.g., via an on-board diagnostic (OBD) port of the vehicle computer system 106). In a similar manner, in some embodiments, the IVMS 102 can monitor the sensors 114(2) of the mobile device 104 over the communication link 108. Examples of the sensors 114 will be described in greater detail with respect to FIG. 2.

Figure 2:
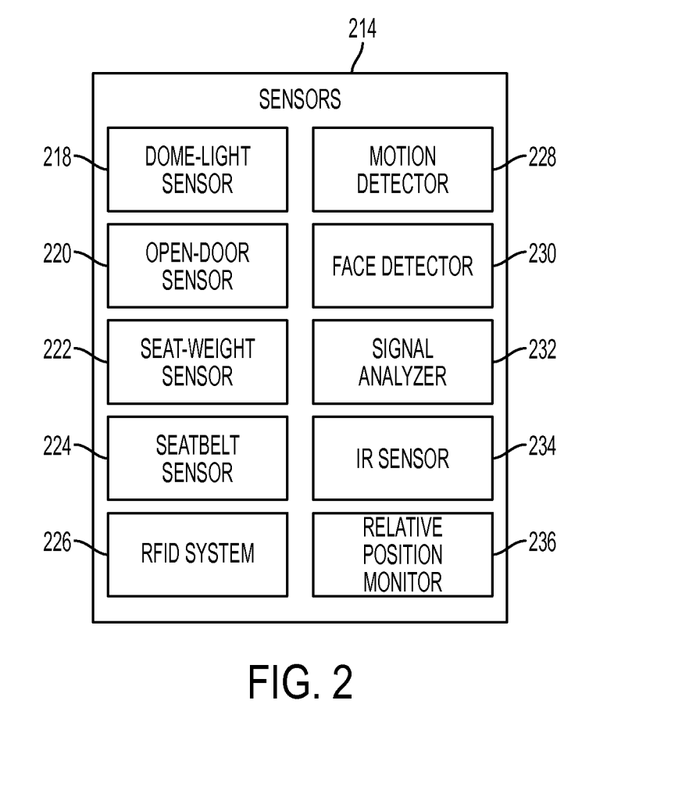
FIG. 2 illustrates examples of sensors.

FIG. 2 illustrates examples of sensors 214. The sensors 214 are shown to include a dome-light sensor 218, an open-door sensor 220, a seat-weight sensor 222, a seatbelt sensor 224, a radio-frequency identification (RFID) system 226, a motion detector 228, a face detector 230, a signal analyzer 232, an infrared sensor system 234, and a relative position monitor 236. It should be appreciated that the sensors 214 are examples of sensors that can be included in a system such as the system 100 of FIG. 1. In various embodiments, the sensors 214 can include more, fewer, or different sensors.

The dome-light sensor 218 can provide an indication of whether a vehicle's dome light has a status of "active," or "on." In many cases, the dome-light sensor 218 can be one of the sensors 114(3) of the vehicle computer system 106. In some embodiments, the dome light can be linked to a vehicle-door status. For example, in various embodiments, the dome-light status might be active whenever a vehicle door has a status of "open." According to this example, a dome-light status of "active" can be an exit indicator relative to the mobile device 104.

In general, the media processor(s) 112 (e.g., the media processor 112(1)) can determine a status of the dome light when monitoring for exit indicators and/or entry indicators. In various cases, the status can be determined by making an affirmative request to the vehicle computer system 106, by waiting for an alert or trigger of a change to the dome-light status, combinations of same, and/or the like. In some embodiments, if the status of the dome light is "active," the mobile device 104 may be considered to have exited the vehicle.

The open-door sensor 220 can provide an indication of whether a vehicle door is open. In many cases, the open-door sensor 220 can be one of the sensors 114(3) of the vehicle computer system 106. In certain embodiments, the open-door sensor 220 can monitor a specific door (e.g., a driver's door), a specific combination of doors (e.g., any front door), all doors of the vehicle, etc. For example, a vehicle-door status of "open" for a driver-side door can be an exit indicator relative to the mobile device 104.

In a typical embodiment, the media processor(s) 112 (e.g., the media processor 112(1)) can determine the vehicle-door status when monitoring for exit indicators and/or entry indicators. In various cases, the vehicle-door status can be determined by making an affirmative request to the vehicle computer system 106, by waiting for an alert or trigger of a change to the door-open status (e.g., a door-open alert), combinations of same, and/or the like. In some embodiments, if the vehicle-door status is "open," the mobile device 104 may be considered to have exited the vehicle.

The seat-weight sensor 222 can provide an indication of a seat weight of at least one seat of the vehicle. For example, the seat-weight sensor 222 can be positioned inside a driver-side seat. In various cases, the seat-weight sensor 222 can be one of the sensors 114(1) of the IVMS 102, one of the sensors 114(3) of the vehicle computer system 106, etc. In certain embodiments, the media processor(s) 112 (e.g., the media processor 112(1)) can determine a seat weight for the driver-side seat when monitoring for exit indicators and/or entry indicators.

In various cases, the seat weight can be determined by making an affirmative request to the seat-weight sensor 222, by waiting for an alert or report from the seat-weight sensor 222, combinations of same, and/or the like. A seat weight of less than a configurable threshold (e.g., seventy pounds) can be an exit indicator (e.g., an indication that the driver-side seat is unoccupied). Similarly, a seat weight of greater than or equal to the configurable threshold can be an entry indicator (e.g., an indication that the driver-side seat is occupied).

The seatbelt sensor 224 can provide an indication of whether one or more seatbelts are locked, or latched. For example, in some embodiments, the seatbelt sensor 224 can be one of the sensors 114(3) of the vehicle computer system 106. According to this example, the media processor(s) 112 (e.g., the media processor 112(1)) can determine a status of a seatbelt of the vehicle, such as a driver-side seatbelt, when monitoring for exit indicators and/or entry indicators.

In various cases, the seatbelt status can be determined by making an affirmative request to the vehicle computer system 106, by waiting for an alert or trigger from the seatbelt sensor 224, combinations of same, and/or the like.

A seatbelt status of "unlocked" (i.e., unlatched) that follows a previous seatbelt status of "locked" (i.e., latched) can be an exit indicator relative to the mobile device 104. In similar fashion, a seatbelt status of "locked" that follows a previous status of "unlocked" can be an entry indicator relative to the mobile device 104.

The RFID system 226 typically distributes functionality between the IVMS 102 and the mobile device 104. In general, the RFID system 226 can be used to determine whether the mobile device 104 is in close proximity to the IVMS 102. In an example, the RFID system 226 can include an RFID reader on the IVMS 102 (e.g., as part of the sensors 114(1)) and an RFID tag on the mobile device 104 (e.g., as part of the sensors 114(2)). According to this example, the RFID reader of the IVMS 102 can periodically transmit a radio signal to interrogate the RFID tag of the mobile device 104. Thereafter, the RFID reader of the IVMS 102 can determine whether the RFID tag is interrogated. In various embodiments, this determination can serve as an indication of distance between the IVMS 102 and the mobile device 104.

For example, for a first radio signal (or set of radio signals), a determination may be made that the RFID tag is interrogated. Later, with respect to one or more subsequent radio signals, a determination may be made that the RFID is not interrogated. In certain embodiments, the transition of the RFID tag from interrogated to not interrogated can be interpreted by the media processor 112(1) of the IVMS 102 to mean that the mobile device 104 is not in close proximity to the IVMS 102. In that way, the subsequent determination that the RFID tag is not interrogated can be an exit indicator relative to the mobile device 104. Conversely, a determination that the RFID tag is interrogated can be interpreted by the media processor 112(1) of the IVMS 102 to mean that the mobile device 104 is in close proximity to the IVMS 102. Thus, in some embodiments, a determination that the RFID tag is interrogated can be an entry indicator relative to the mobile device 104.

The media processor 112(1) can monitor the RFID system 226 when monitoring for exit indicators and/or entry indicators. For example, in certain embodiments, the media processor 112(1) can make affirmative requests to the RFID system 226 or a component thereof (e.g., the RFID reader), wait for alerts or triggers from the RFID system 226 or a component thereof, combinations of same, and/or the like.

The motion detector 228 can provide an indication of whether motion is detected inside the vehicle, or in a portion of the vehicle that is visible to the motion detector 228 (e.g., a driver-side region of the vehicle). For example, the motion detector 228 can be one of the sensors 114(1) of the IVMS 102. In certain embodiments, the media processor(s) 112 (e.g., the media processor 112(1)) can determine whether motion is detected in the interior of the vehicle when monitoring for exit indicators and/or entry indicators.

In various cases, the determination of whether motion is detected can be accomplished by making affirmative requests to the motion detector 228, by waiting for an alert or report from the motion detector 228, combinations of same, and/or the like. For example, in certain embodiments, the fact that no motion is detected within a configurable period of time (e.g., ten seconds) can be an exit indicator relative to the mobile device 104. By way of further example, in certain embodiments, the fact that motion is detected after a previous period during which no motion was detected can be an entry indicator relative to the mobile device 104.

The face detector 230 can provide an indication of whether human presence is detected inside the vehicle or within a certain portion of the vehicle (e.g., a driver-side portion of the vehicle). In certain embodiments, the face detector 230 can include hardware (e.g., a video camera) and software that captures and analyzes a live video feed inside the vehicle. In certain embodiments, the face detector 230 is operable to identify faces, for example, within a camera field-of-view. For example, the face detector 230 can be one of the sensors 114(1) of the IVMS 102. In certain embodiments, the media processor(s) 112 (e.g., the media processor 112(1)) can determine, when monitoring for exit indicators and/or entry indicators, whether human presence is detected in the interior of the vehicle based, at least in part, on whether faces are detected.

In various cases, the determination of whether human presence is detected can be accomplished by making affirmative requests to the face detector 230, by waiting for an alert or report from the face detector 230, combinations of same, and/or the like. For example, in certain embodiments, the fact that no faces are detected within a configurable period of time (e.g., ten seconds) can be an exit indicator relative to the mobile device 104. By way of further example, in certain embodiments, the fact that at least one face is detected after a previous period during which no faces were detected can be an entry indicator relative to the mobile device 104.

The signal analyzer 232 can measure power present in a radio signal received from the mobile device 104. In a typical embodiment, the signal analyzer 232 can be one of the sensors 114(1) of the IVMS 102. For example, the signal analyzer 232 can evaluate a received signal strength indication (RSSI) for a wireless transmission received from the mobile device 104. In an example, the mobile device 104 can periodically transmit a radio signal to the IVMS 102. In some cases, the mobile device 104 may be prompted by the IVMS to transmit the radio signal. Thereafter, the signal analyzer can determine a RSSI for the radio signal. In various embodiments, this determination can serve as an indication of distance between the IVMS 102 and the mobile device 104.

For example, in certain embodiments, a determination that the RSSI is less than a threshold value can be interpreted by the media processor 112(1) of the IVMS 102 to mean that the mobile device 104 is not in close proximity to the IVMS 102. In that way, the determination that the RSSI is less than the threshold value can be an exit indicator relative to the mobile device 104. Conversely, a determination that the RSSI is greater than or equal to the threshold value can be interpreted by the media processor 112(1) of the IVMS 102 to mean that the mobile device 104 is in close proximity to the IVMS 102. Thus, in some embodiments, a determination that the RSSI is greater than or equal to the threshold value can be an entry indicator relative to the mobile device 104.

The media processor 112(1) can monitor the signal analyzer 232 when monitoring for exit indicators and/or entry indicators. For example, in certain embodiments, the media processor 112(1) can make affirmative requests to the signal analyzer 232, wait for alerts or triggers from the signal analyzer 232, combinations of same, and/or the like.

The IR sensor system 234 can transmit and measure reflection from IR beams. In a typical embodiment, the IR sensor system 234 can be one of the sensors 114(2) of the mobile device 104. In general, the IR sensor system 234 can be used to determine whether the mobile device 104 is inside the vehicle. In an example, the IR sensor system 234 can include an IR transmitter and an IR sensor. According to this example, the IR transmitter can periodically transmit an IR beam. Thereafter, an intensity of a reflection of the IR beam, if any, can be measured by the IR sensor. In various embodiments, the measured intensity can serve as an indication of whether the mobile device 104 is located inside the vehicle.

In certain embodiments, the IR sensor system 234 leverages the fact that, as a general matter, when the mobile device 104 is located inside the vehicle, the distance between the mobile device 104 and any surface of the vehicle is typically on the order of several feet or less. Therefore, in certain embodiments, a measured intensity of less than a threshold value, or the absence of any detectable reflection, can be interpreted by the media processor 112(2) of the mobile device 104 to mean that the mobile device 104 is outside the vehicle. In this manner, a measured intensity of less than the threshold value, or no measured intensity at all, can be an exit indicator relative to the mobile device 104. Conversely, a measured intensity of greater than or equal to the threshold value can be an entry indicator relative to the mobile device 104.

The media processor 112(2) can monitor the IR sensor system 234 when monitoring for exit indicators and/or entry indicators. For example, in certain embodiments, the media processor 112(2) can make affirmative requests to the IR sensor system 234, wait for alerts or triggers from the IR sensor system 234, combinations of same, and/or the like.

The relative position monitor 236 can sense changes to a relative position of the mobile device 104. In a typical embodiment, the relative position monitor 236 can be one of the sensors 114(2) of the mobile device 104. In an example, the relative position monitor 236 can include an accelerometer, gyroscope, and/or the like. In certain embodiments, the relative position monitor 236 determines an initial position upon a trigger condition such as, for example, activation of the IVMS 102, initiation of the mobile device 104, etc. Thereafter, the relative position monitor 236 can monitor the position of the mobile device 104 relative to the initial position.

According to this example, if the mobile device 104 is determined to have a relative position that satisfies applicable criteria such as, for example, a certain minimal amount of positional change, the media processor 112(2) can interpret the relative position to be outside the vehicle. In that way, the relative position can be an exit indicator with respect to the mobile device 104. The media processor 112(2) can monitor the relative position monitor 236 when monitoring for exit indicators and/or entry indicators. For example, in certain embodiments, the media processor 112(2) can make affirmative requests to the relative position monitor 236, wait for alerts or triggers from the relative position monitor 236, combinations of same, and/or the like.

Figure 3A:
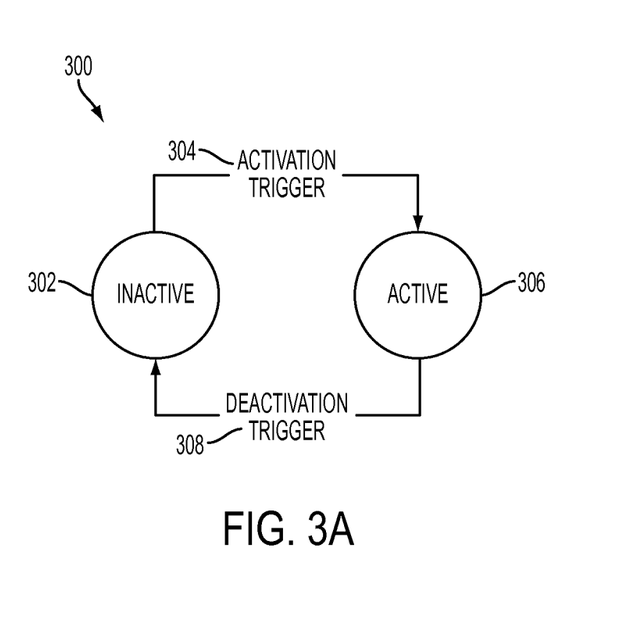
FIGS. 3A-3B illustrate an example of processing and storing a live media stream on an in-vehicle media system.
Figure 3B:
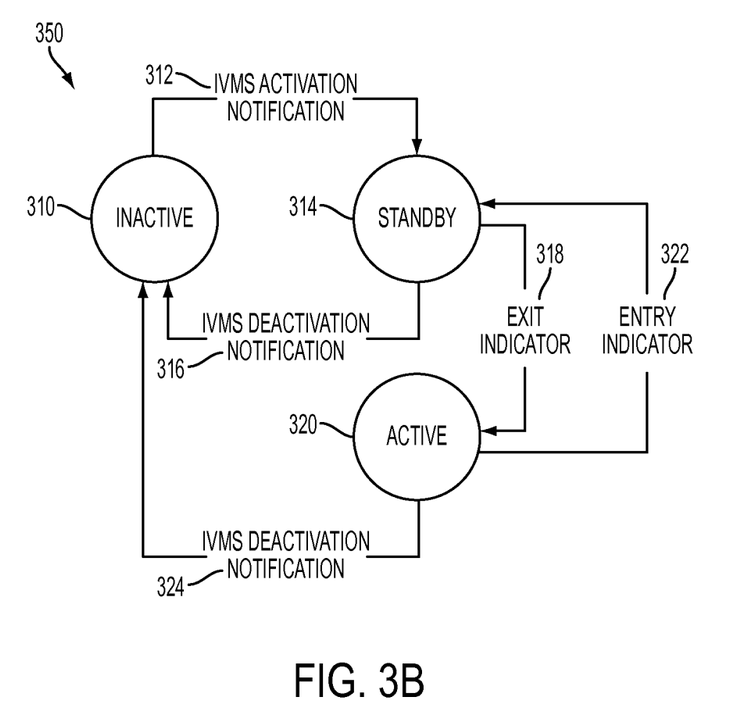

FIGS. 3A-3B illustrate an example of processing and storing a live media stream on the IVMS 102. In particular, FIG. 3A illustrates an example state diagram 300 for the IVMS 102, and FIG. 3B illustrates an example state diagram 350 for the mobile device 104.

With particular reference to FIG. 3A, in the illustrated embodiment, the IVMS 102 exists in either an inactive state 302 or an active state 306. While in the inactive state 302, the IVMS 102 typically does not record media. In response to an activation trigger 304, the IVMS 102 can transition from the inactive state 302 to the active state 306. The activation trigger 304 can be, for example, a manual trigger by an operator or user, an automated trigger in response to detecting an event (e.g., emergency-light activation, siren activation, a detected speed in excess of a threshold, excessive g-force events, etc.) and/or the like. Examples of event detection are described in the '995 patent, which patent is incorporated by reference above. Further examples are described in U.S. patent application Ser. No. 12/694,931 ("the '931 application"). The '931 application is hereby incorporated by reference.

While in the active state 306, the IVMS 102 typically records media from one or more media sources, which sources can include video cameras (e.g., dashcams), microphones, and/or the like. In addition, the one or more media sources can, in some cases, include the mobile device 104. In a typical embodiment, the IVMS 102 can record a live media stream received from the mobile device 104. As will be described in greater detail with respect to FIG. 3B, the live media stream may be selectively received and recorded based on exit and/or entry indicators.

In response to a deactivation trigger 308, the IVMS 102 can transition from the active state 306 to the inactive state 302. The deactivation trigger 308 can be, for example, a manual trigger by an operator or user, a detected conclusion to the event (e.g., emergency-light deactivation, siren deactivation, an expiration of a period of time, etc.), and/or the like.

With particular reference to FIG. 3B, in the illustrated embodiment, the mobile device 104 can exist in an inactive state 310, a standby state 314, or an active state 320. For illustrative purposes, examples of automated transitions among the inactive state 310, the standby state 314, and the active state 320 are described below. It should be appreciated that, in some embodiments, manual triggers by an operator can cause a transition to any state at any given time and/or override any of the transitions described below.

In the inactive state 310, the mobile device 104 is typically dormant. Upon receipt of an IVMS activation notification 312, the mobile device 104 transitions to the standby state 314. In certain embodiments, the IVMS activation notification 312 is transmitted by the IVMS 102 to the mobile device 104 upon transition by the IVMS 102 to the active state 306 described above.

In the standby state 314, the mobile device 104 awaits an exit indicator 318. As described above with respect to FIGS. 1-2, in various embodiments, the exit indicator 318 can be detected by the media processor 112(1) of the IVMS 102, the media processor 112(2) of the mobile device 104, and/or another component. For example, the exit indicator 318 can relate to information or outputs generated by any of the sensors 214 described above. In embodiments in which the media processor 112(1) detects the exit indicator 318, the detection can be communicated to the mobile device 104 over the communication link 108.

Upon detecting or being informed of the exit indicator 318, the mobile device 104 transitions from the standby state 314 to the active state 320. If a deactivation notification 316 is received by the mobile device 104, the mobile device 104 transitions from the standby state 314 to the inactive state 310. In certain embodiments, the IVMS deactivation notification 316 is transmitted by the IVMS 102 to the mobile device 104 upon transition by the IVMS 102 to the inactive state 302 described above.

In the active state 320, the mobile device 104 continuously captures and transmits a live media stream to the IVMS 102, for example, over the communication link 108. In addition, while in the active state 320, the mobile device 104 can await an entry indicator 322. As described above relative to FIGS. 1-2, in various embodiments, the entry indicator 322 can be detected by the media processor 112(1) of the IVMS 102, the media processor 112(2) of the mobile device 104, and/or another component. For example, the entry indicator 322 can relate to information or outputs generated by any of the sensors 214 described above. In embodiments in which the media processor 112(2) detects the entry indicator 322, the detection can be communicated to the mobile device 104 over the communication link 108. Upon detecting or being informed of the entry indicator 322, the mobile device 104 transitions from the active state 320 to the standby state 314. If a deactivation notification 324 is received while the mobile device 104 is in the active state 320, the mobile device 104 transitions from the active state 320 to the inactive state 310.

Figure 4:
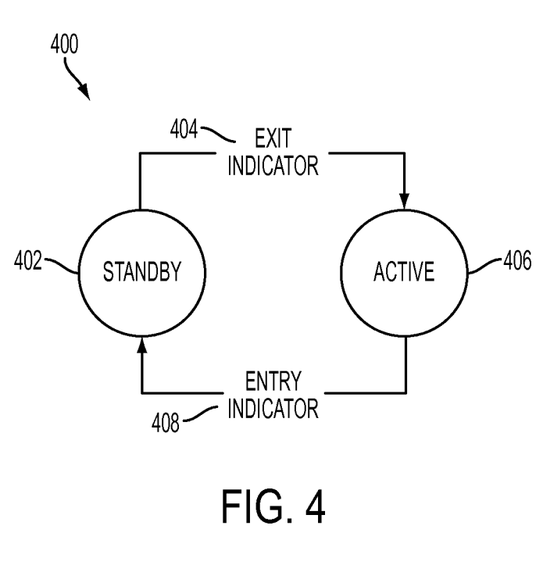
FIG. 4 illustrates an example of processing and storing a live media stream on a mobile device.

FIG. 4 illustrates an example of processing and storing a live media stream on the mobile device 104. In particular, FIG. 4 illustrates an example state diagram 400. It should be appreciated that, in some embodiments, the IVMS 102 and the vehicle computer system 106 can be omitted. That is, in some implementations, the mobile device 104 can operate in a standalone manner. In other embodiments, the IVMS 102 and/or the vehicle computer system 106 can be included. In the illustrated embodiment, the mobile device 104 exists in an standby state 402 or an active state 406.

In the standby state 402, the mobile device 104 awaits an exit indicator 404. As described above with respect to FIGS. 1-2, in various embodiments, the exit indicator 404 can be detected by the media processor 112(1) of the IVMS 102, the media processor 112(2) of the mobile device 104, and/or another component. For example, the exit indicator 404 can relate to information or outputs generated by any of the sensors 214 described above. In embodiments in which the media processor 112(1) detects the exit indicator 404, the detection can be communicated to the mobile device 104 over the communication link 108.

Upon detecting or being informed of the exit indicator 404, the mobile device 104 transitions from the standby state 402 to the active state 406. In the active state 406, the mobile device 104 continuously captures and stores a live media stream in the storage 125. In addition, while in the active state 406, the mobile device 104 can await an entry indicator 408. As described above in relation to FIGS. 1-2, in various embodiments, the entry indicator 408 can be detected by the media processor 112(1) of the IVMS 102, the media processor 112(2) of the mobile device 104, and/or another component. For example, the entry indicator 408 can relate to information or outputs generated by any of the sensors 214 described above. In embodiments in which the media processor 112(1) detects the entry indicator 408, the detection can be communicated to the mobile device 104 over the communication link 108. Upon detecting or being informed of the entry indicator 408, the mobile device 104 transitions from the active state 406 to the standby state 402.

Figure 5:
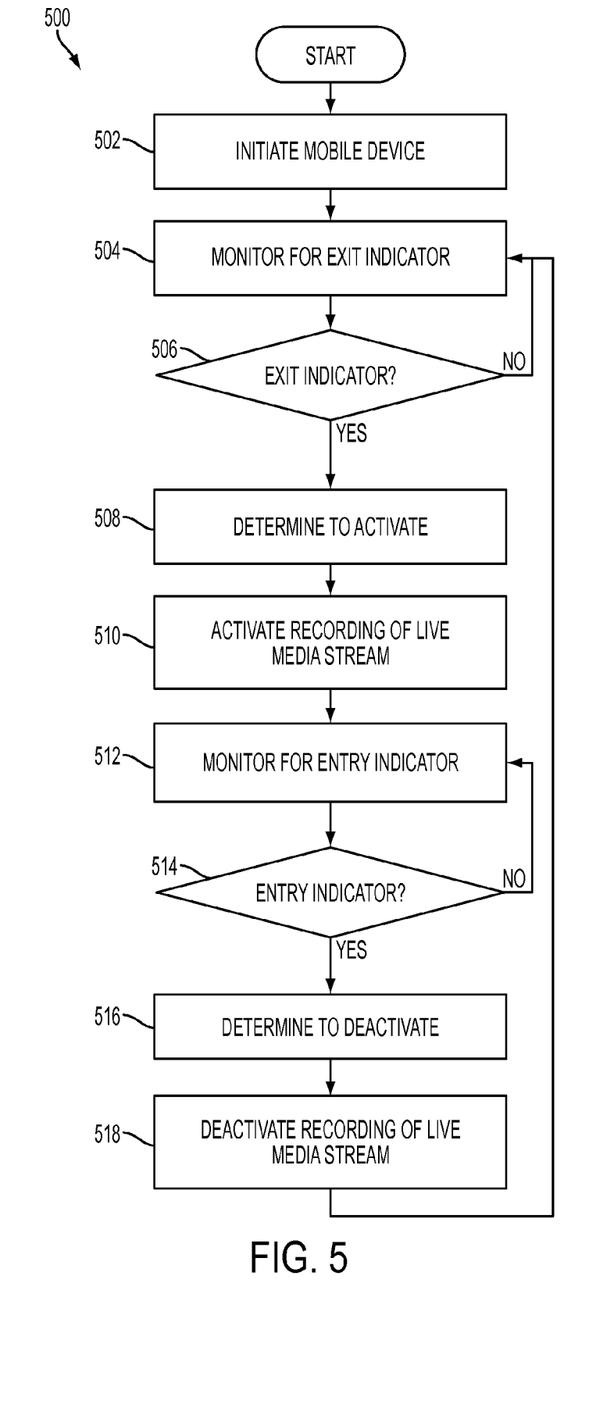
FIG. 5 illustrates an example of a process for intelligently recording a live media stream.

FIG. 5 illustrates an example of a process 500 for intelligently recording a live media stream. For example, the process 500, in whole or in part, can be implemented by one or more of the IVMS 102, the mobile device 104, the vehicle computer system 106, the media processor 112(1), the media processor 112(2), the media capture component 120, and/or the sensors 114. The process 500 can also be performed generally by the system 100. Although any number of systems, in whole or in part, can implement the process 500, to simplify discussion, the process 500 will be described in relation to specific systems or subsystems of the system 100.

At block 502, the mobile device 104 is initiated. In some implementations, the initiating can include powering on the mobile device 104. Alternatively, or additionally, the initiating can include transition of the mobile device to a standby state such as the standby state 314 of FIG. 3 or the standby state 402 of FIG. 4. At block 504, the media processor(s) 112 monitor environmental conditions for an exit indicator. At decision block 506, the media processor(s) 112 determine whether an exit indicator has been detected. If not, the process 500 returns to block 504 and proceeds as described above. Otherwise, if it is determined at the decision block 506 that an exit indicator has been detected, the process 500 proceeds to block 508.

At block 508, the media processor(s) 112 determine to activate recording of the live media stream. At block 510, recording of the live media stream is activated. Thereafter, the live media stream can be continuously recorded, for example, in any of the ways described above with respect to FIGS. 1-4. At block 512, the media processor(s) 112 monitor environmental conditions for an entry indicator. At decision block 514, the media processor(s) 112 determine whether an entry indicator has been detected. If not, the process 500 returns to block 512 and proceeds as described above. Otherwise, if it is determined at the decision block 514 that an entry indicator has been detected, the process 500 proceeds to block 516.

At block 516, the media processor(s) 112 determine to deactivate recording of the live media stream. At block 518, recording of the live media stream is deactivated. Thereafter, depending on implementation, the IVMS 102 and/or the mobile device 104 can refrain from transmitting and recording the live media stream. From block 518, the process 500 returns to block 504 and proceeds as described above. In various embodiments, the process 500 can continue until terminated or suitable stop criteria is met.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising:
at least one processor for performing the following:
initiating a mobile device that is configured to continuously capture a live media stream;
deactivating recording of the live media stream;
determining whether the mobile device has exited a defined physical area by using information from one or more sensors; and
responsive to a determination using the information from the one or more sensors that the mobile device has exited the defined physical area, activating recording of the live media stream.

2. The method of claim 1, wherein the initiating, the deactivating, the determining, and the activating are performed, at least in part, by the mobile device.

3. The method of claim 1, comprising
continuously recording the live media stream responsive to the activating.

4. The method of claim 3, comprising:
subsequent to the continuously recording, using the information from the one or more sensors to determine whether the mobile device has entered the defined physical area; and
responsive to a determination that the mobile device has entered the defined physical area, deactivating recording of the live media stream.

5. The method of claim 1, wherein the defined physical area comprises an interior of a vehicle.

6. The method of claim 5, wherein:
the information is utilized to determine a status of a vehicle door; and
the one or more sensors comprise a vehicle-door status of open.

7. The method of claim 5, wherein:
the information is utilized to determine a status of a dome light that is linked to a vehicle-door status; and
the one or more sensors comprise a dome-light status of active.

8. The method of claim 5, wherein:
the information is utilized to determine a seat weight for at least one seat of the vehicle; and
the one or more sensors comprise a seat-weight determination of less than a threshold weight.

9. The method of claim 5, wherein:
the information is utilized to determine a status of at least one seatbelt of the vehicle; and
the one or more sensors comprise a seatbelt status of locked.

10. The method of claim 5, further comprising:
transmitting a radio signal to interrogate a radio-frequency identification (RFID) tag associated with the mobile device;
determining whether the RFID tag is interrogated; and
wherein the one or more sensors comprise a determination that the RFID tag is not interrogated.

11. The method of claim 5, further comprising:
determining whether human presence is detected in a live video feed of the interior of the vehicle; and
wherein the one or more sensors comprise a determination that no human presence is detected in the live video feed.

12. The method of claim 5, further comprising:
determining whether motion is detected in the interior of the vehicle; and
wherein the one or more sensors comprise a determination that no motion is detected.

13. The method of claim 5, further comprising:
evaluating a received signal strength indication (RSSI) for the mobile device; and
wherein the one or more sensors comprise a determination that the RSSI is less than a threshold value.

14. The method of claim 5, further comprising:
the mobile device transmitting an infrared (IR) beam;
measuring reflection intensity relative to the IR beam; and
wherein the one or more sensors comprise a measured reflection intensity of less than a threshold value.

15. The method of claim 5, further comprising:
determining a relative position of the mobile device using at least one of accelerometer data and gyroscope data; and
wherein the one or more sensors comprise a relative-position determination that is outside the vehicle.

16. The method of claim 5, wherein the one or more sensors comprise inputs from at least one of the following: an open-door sensor, a dome-light sensor, a radio-frequency identification (RFID) system, a face-detection system, a motion-detection system, an infrared sensor system, an accelerometer, and a gyroscope.

17. The method of claim 1, wherein:
the mobile device comprises a wearable camera; and
the live media stream comprises a live video stream.

18. A system comprising:
at least one processor, wherein the at least one processor is operable to implement a method comprising:
initiating a mobile device that is configured to continuously capture a live media stream;
deactivating recording of the live media stream;
determining whether the mobile device has exited a defined physical area by using information from one or more sensors; and
responsive to a determination using the information from the one or more sensors that the mobile device has exited the defined physical area, activating recording of the live media stream.

19. A computer-program product comprising a non-transitory computer-usable medium having computer-readable program code embodied therein, the computer-readable program code adapted to be executed to implement a method comprising:
initiating a mobile device that is configured to continuously capture a live media stream;
deactivating recording of the live media stream;
determining whether the mobile device has exited a defined physical area by using information from one or more sensors; and
responsive to a determination using the information from the one or more sensors that the mobile device has exited the defined physical area, activating recording of the live media stream.

* * * * *